United States Patent
Hashii et al.

(10) Patent No.: US 8,284,447 B2
(45) Date of Patent: Oct. 9, 2012

(54) IMAGE PROCESSING APPARATUS AND PROFILE GENERATING METHOD

(75) Inventors: Yusuke Hashii, Kawasaki (JP); Fumihiro Goto, Kawasaki (JP); Tetsuya Suwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 980 days.

(21) Appl. No.: 12/147,294

(22) Filed: Jun. 26, 2008

(65) Prior Publication Data
US 2009/0002783 A1 Jan. 1, 2009

(30) Foreign Application Priority Data
Jun. 29, 2007 (JP) ................................. 2007-172747

(51) Int. Cl.
*G06F 1/00* (2006.01)
*H04N 1/40* (2006.01)
(52) U.S. Cl. .......... 358/1.9; 358/518; 358/523; 358/525
(58) Field of Classification Search .................. 358/1.9, 358/518, 523, 525, 501
See application file for complete search history.

(56) References Cited

U.S. PATENT DOCUMENTS
5,933,252 A 8/1999 Emori et al.
6,778,185 B1 * 8/2004 Moroney ...................... 345/590

FOREIGN PATENT DOCUMENTS
JP 4-40072 A 2/1992
JP 6-225130 A 8/1994
JP 2004-104603 A 4/2004

* cited by examiner

*Primary Examiner* — Houshang Safaipour
(74) *Attorney, Agent, or Firm* — Canon U.S.A., Inc. IP Division

(57) ABSTRACT

Color compression processing capable of sufficiently maintaining a visual constant hue property even after the color compression processing is realized. There is provided a method for generating a profile used to convert a color of a first color reproduction range into a color of a second color reproduction range. The method includes dividing each of the first and second color reproduction ranges into a plurality of regions, performing color space conversion for individual regions in accordance with color space definitions unique to the individual regions, and generating a profile used to convert the color of the first color reproduction range into the color of the second color reproduction range based on color coordinates obtained through the color space conversion performed for individual regions.

19 Claims, 12 Drawing Sheets

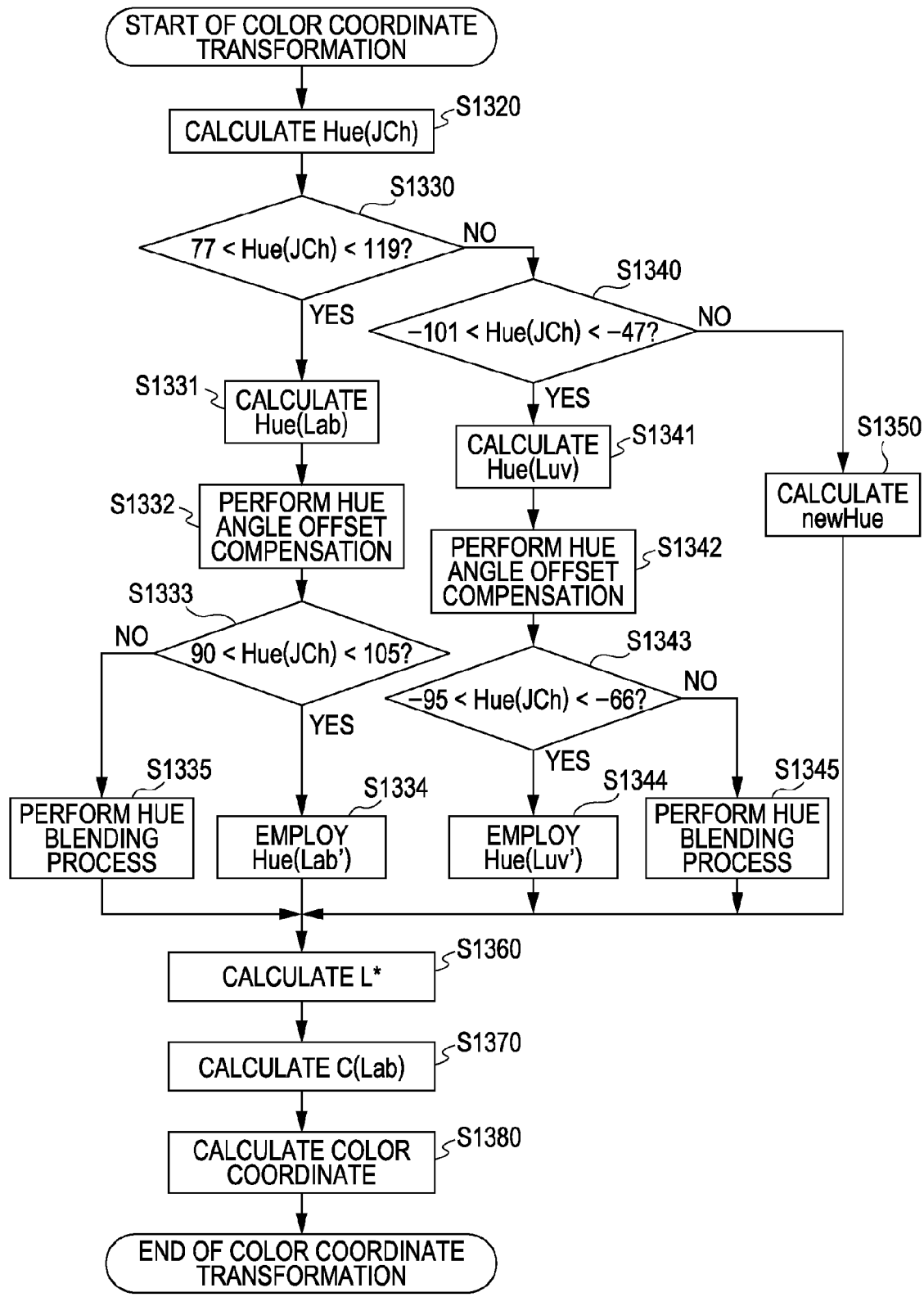

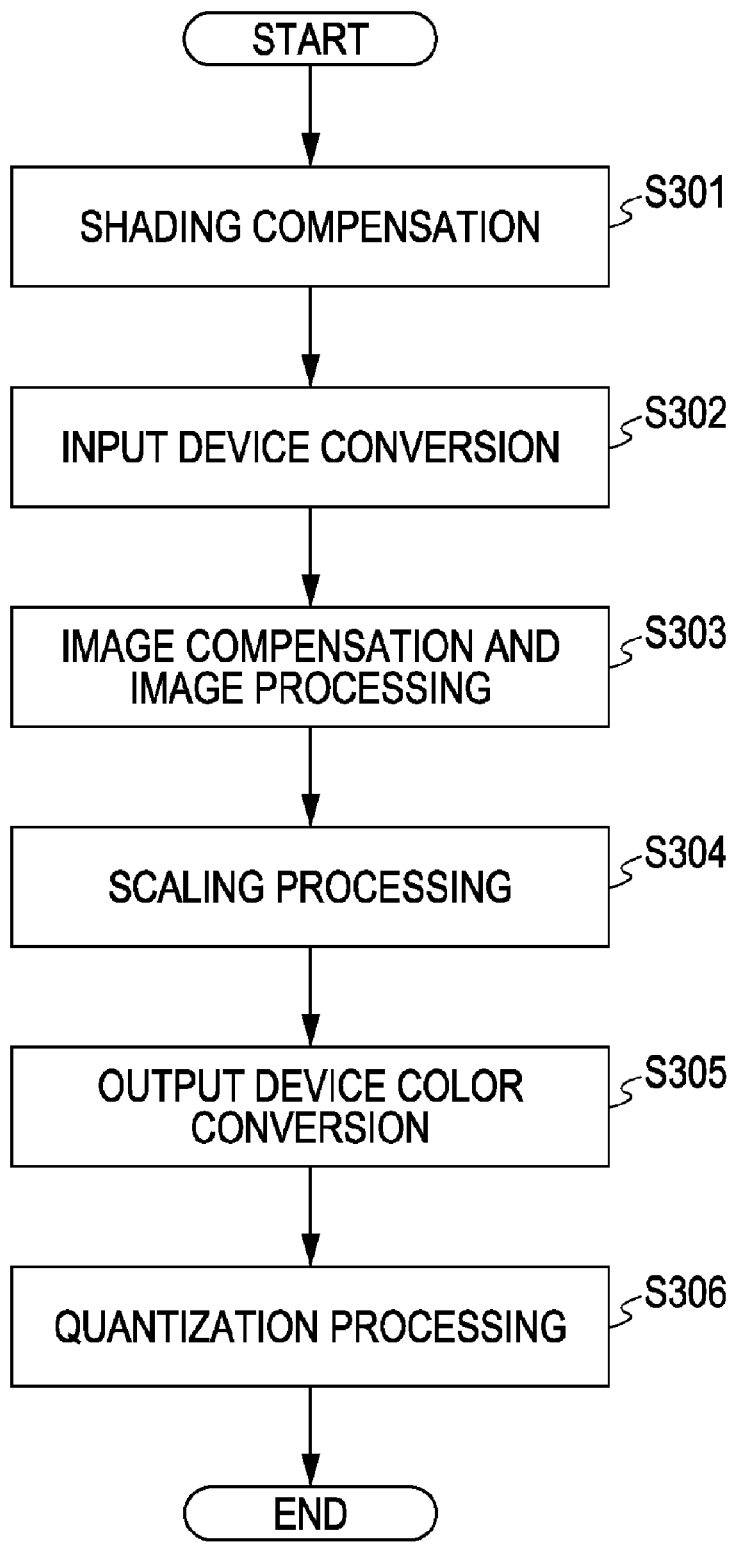

IMAGE PROCESSING APPARATUS AND PROFILE GENERATING METHOD

BACKGROUND OF THE INVENTION

1. Field of the Invention

The present invention relates to profile generating methods and image processing apparatuses, and particularly relates to a method for defining device-independent color spaces used for color conversion using profiles.

2. Description of the Related Art

In recent years, digital apparatuses such as digital still cameras and image scanners have become increasingly popular and digital images are readily obtained. In addition, techniques of full-color hard-copying have been rapidly developed. In particular, a printing quality of an inkjet printing technique rivals that of silver halide photography, and the inkjet printing technique has been widely used. Furthermore, networking systems such as the Internet have become increasingly popular, and a number of users can connect various devices to the network systems. In such a circumstance in which various I/O devices are connected to the network systems, there are several occasions in which a color image displayed on a monitor attaining wide color gamut is hard-copied using a printer having a color reproduction gamut different from that of the monitor, that is, color image data is input and output between devices having different color gamuts.

As a technique of reproducing identical colors using devices employing different color gamuts, a color management system (hereinafter referred to as a "CMS") is widely known. FIG. 1 is a diagram illustrating an outline of a configuration of the CMS which uses a device-independent color space.

Referring to FIG. 1, when an input device (such as a camera or a scanner) is connected to an output device (such as a printer or a monitor), color signals of an input system are converted into color signals of an output system using corresponding profiles and device-independent color spaces (PCSs). Note that examples of the PCSs include CIEXYZ and CIELab. The profiles are provided as conversion expressions for associating colors employed in the devices with the PCSs or as look-up-tables which are conversion tables including the relationships between the colors employed in the devices and the PCSs described in advance.

In the CMS, when the devices reproduce colors, a gamut compression technique of reducing influence of color gamuts different between the input device and the output device is employed so that the output device reproduces color reproducible using the input device or the input device obtains color reproducible using the output device.

For example, Japanese Patent Laid-Open No. 6-225130 discloses a general gamut compression technique employed in an input device and an output device having different color gamuts. Specifically, Japanese Patent Laid-Open No. 6-225130 discloses a technique of converting an input color space into a uniform color space which is a device-independent color space, and compressing colors in the uniform color space which are not reproducible using the output device in a direction in which a color difference is minimized, and a technique of performing nonlinear compression in accordance with saturation in a direction in which brightness is fixed. Furthermore, Japanese Patent Laid-Open No. 4-40072 discloses a method for converting an input color space into a uniform color space or an HVC (hue, value, and chroma) color space which are device-independent color spaces, and determining whether a color of the converted color space is out of the color gamut of an output-destination device. When it is determined that the color is out of the color gamut, the color is compressed so as to have brightness and hue which are not changed and a saturation of a maximum color value in a reproducible range of the output destination device.

Furthermore, Japanese Patent Laid-Open No. 2004-104603 discloses a technique of compressing a gamut while a hue of a HVC color space is maintained.

However, when the technique of compressing a gamut is performed in a single color space as described above, some hues may not be visually maintained after the compression.

For example, when blue is subjected to gamut compression toward an achromatic axis in a CIELab color space, a phenomenon in which a color obtained after the gamut compression is viewed as purplish blue may occur. Similarly, when blue is subjected to the gamut compression toward the achromatic axis in a CIELuv color space, influence of this phenomenon is reduced. However, when red is subjected to the gamut compression toward the achromatic axis in the CIELuv color space, a phenomenon in which a color obtained after the gamut compression is viewed as a color closer to magenta when compared with a color before gamut compression may occur. When red is subjected to the gamut compression toward the achromatic axis in the CIELab color space, influence of this phenomenon is reduced.

When hues are focally compared with one another as described above, visual constant hue maintaining properties (hereinafter referred to as "visual constant hue properties") are considerably different among types of color space definitions.

An example of a method for evaluating a visual constant hue property in a color space will be described.

First, four colors, i.e., a primary color of a hue of interest (red in this example), white, black, and gray are selected, and these four colors are subjected to color conversion in a color space (Lab in this example) to be evaluated. Accordingly, color coordinates (an L-value, an a-value, and a b-value in this example) for the four colors are obtained.

Then, the color coordinate of the primary color and the color coordinate of white are compensated for each other so that gradation is generated. Similarly, the color coordinate of the primary color and the color coordinate of black are compensated for each other so that gradation is generated, and the color coordinate of the primary color and the color coordinate of gray are compensated for each other so that gradation is generated. Note that the gradation may have continuous levels or may be a patch having necessary and sufficient steps.

FIG. 3 shows examples of obtained gradation images.

Patches which constitute the corresponding gradation images have an identical hue angle in a color space to be evaluated.

By performing visibility evaluation on the hue angle, a visual constant hue property of the hue of interest is obtained.

Gradation images the same as those obtained in the color space of interest are generated using the four colors in another color space (Luv in this example) and are compared with the gradation images in the color space of interest. In this way, a color space which has a higher visual constant hue property for the hue of interest is determined as evaluation through the comparison between these color spaces.

When the CIELab (hereinafter referred to as an "Lab"), the CIELuv (hereinafter referred to as an "Luv"), and CIECAM02 (JCh) which are widely used color spaces are subjected to main-hue visibility evaluation through the procedure described above, the following results are obtained.

In the vicinity of yellow, the highest visual constant hue property is obtained in the CIELab color space. In the vicinity of blue, the highest visual constant hue property is obtained in the CIELuv color space. In the vicinities of other colors, the highest visual constant hue properties are obtained in the CIECAM02 (JCh).

The visibility evaluation is performed under an environment of a D50 standard light source, and JCh is obtained as an environmental variable specified in the CIECAM02 so as to conform to the environment.

As described above, it is apparent that a visual constant hue property is not sufficiently assured by a hue in color compression using a single color space disclosed in the related art.

Accordingly, there is a demand of a gamut compression method which sufficiently assures the visual constant hue property even after compression of any hue.

SUMMARY OF THE INVENTION

The present invention provides a method for generating a profile used to convert a color of a first color reproduction range into a color of a second color reproduction range. The method includes dividing each of the first and second color reproduction ranges into a plurality of regions, performing color space conversion for individual regions in accordance with color space definitions unique to the individual regions, and generating a profile used to convert the color of the first color reproduction range into the color of the second color reproduction range based on color coordinates obtained through the color space conversion performed for individual regions.

Further features of the present invention will become apparent from the following description of exemplary embodiments with reference to the attached drawings.

BRIEF DESCRIPTION OF THE DRAWINGS

FIG. 9 is a flowchart illustrating color-coordinate transformation processing in detail according to the exemplary embodiment.

FIG. 14 is a flowchart illustrating image processing performed using the MFP apparatus according to the exemplary embodiment.

DESCRIPTION OF THE EMBODIMENTS

Color processing according to exemplary embodiments of the present invention will be described hereinafter with reference to the accompanying drawings. Note that an sRGB color space which is a general input color space of digital still cameras is taken as an example of an input color space, and an inkjet printer is taken as an example of an output device. In this exemplary embodiment, a method for generating a profile and a multifunction printer apparatus which realizes a copy function using the generated profile will be described. However, the method for generating profiles described below is also applicable to gamut compression performed for different RGB color gamuts, that is, an AdobeRGB color space proposed by Adobe Systems Incorporated as the input color space and the sRGB color space as an output color space. Furthermore, when the generated profile is incorporated in an sRGB display apparatus, for example, effects the same as those obtained in this exemplary embodiment will be attained. Accordingly, an excellent Adobe image can be displayed on a screen, for example.

MFP Apparatus

Figure 1:
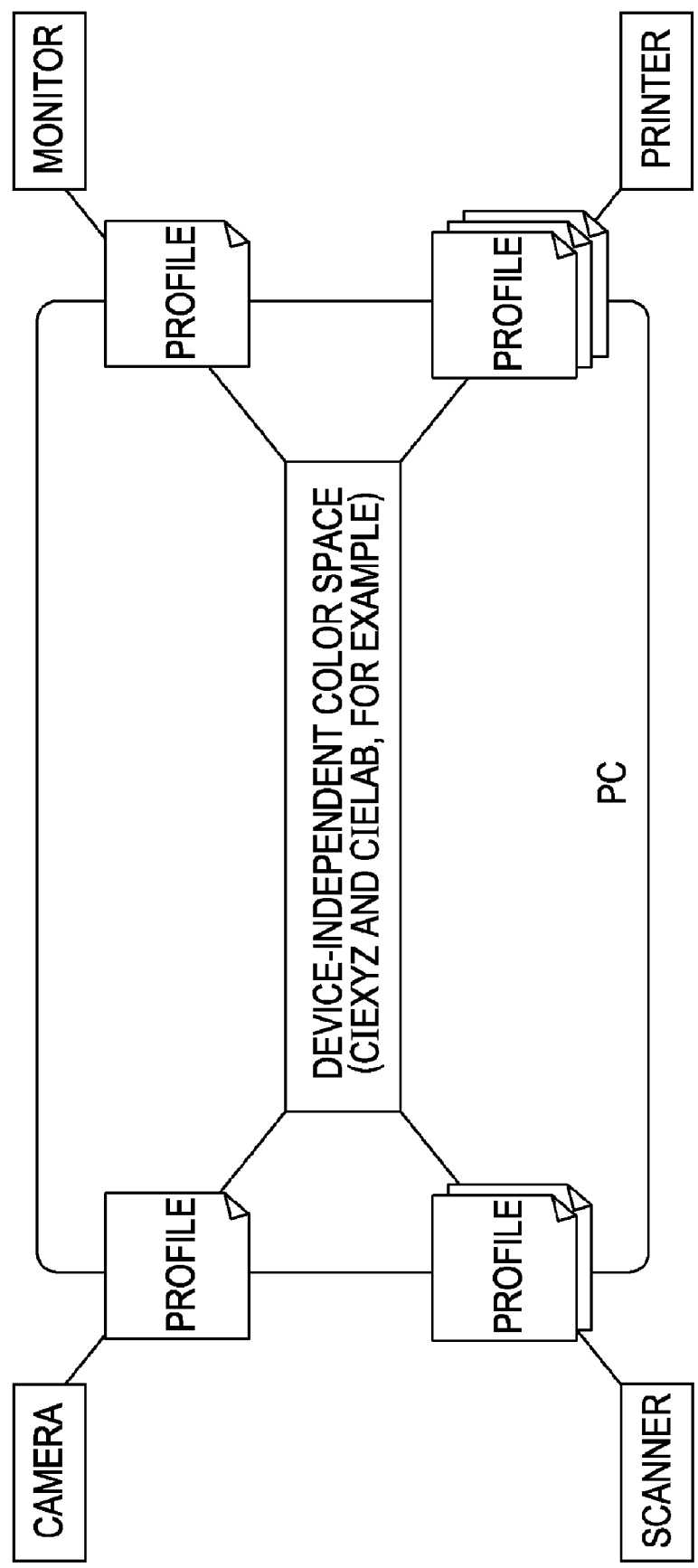
FIG. 1 is a diagram illustrating a configuration of a CMS.
Figure 2:
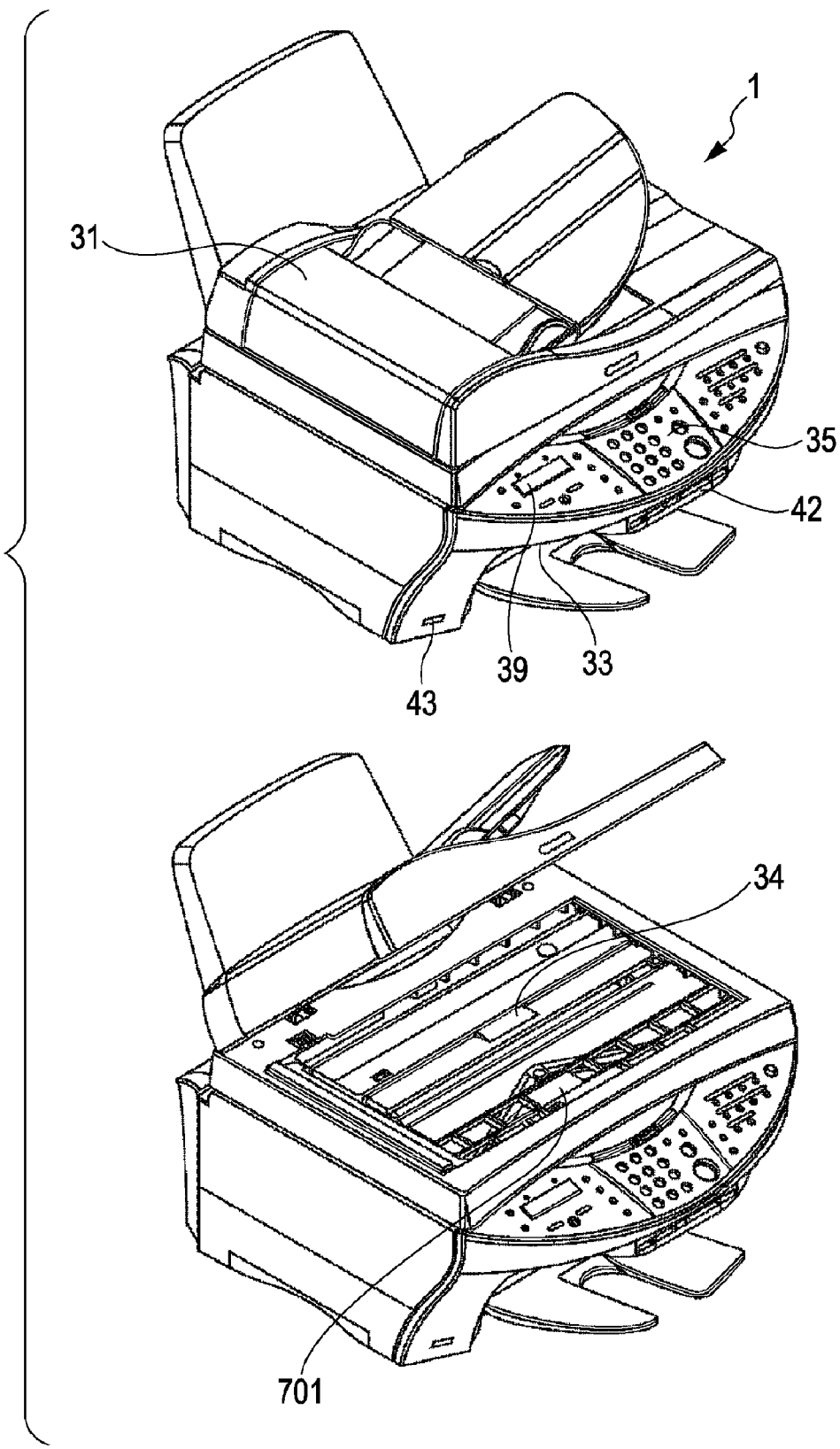
FIG. 2 is a perspective view illustrating an MFP apparatus according to an exemplary embodiment.
Figure 3:
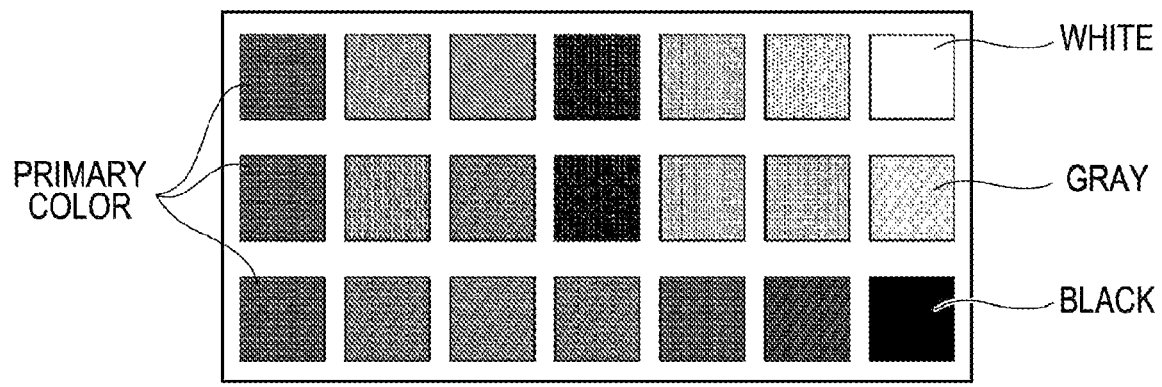
FIG. 3 shows gradation images generated using a primary color, white, black, and gray.

FIG. 2 is a perspective view illustrating a multifunction printer apparatus (hereinafter referred to as an "MFP apparatus") 1 according to an exemplary embodiment of the present invention. The MFP apparatus 1 has a function of receiving data from a host computer (PC) and printing the data, which is a function included in a general PC printer, and a function as a scanner. Furthermore, the MFP apparatus 1 has a copy function of printing an image read using a scanner, a function of directly reading image data stored in a storage medium such as a memory card and printing the image data, or a function of receiving image data from a digital still camera and printing the image data.

Referring to FIG. 2, the MFP apparatus 1 includes a reading device 34 such as a flat head scanner, a printing device 33 such as an inkjet printing device or an electrophotography printing device, a display panel 39, and an operating panel 35 including various key switches. Furthermore, the MFP apparatus 1 includes a USB port on a rear surface thereof (not shown) used to communicate with the PC. In addition, the MFP apparatus 1 includes a card slot 42 used to read data from various memory cards, a camera port 43 used to perform data communication with a digital still camera, and an auto document feeder (hereinafter referred to as an "ADF") 31 used to automatically set an original on a platen glass.

Figure 13:
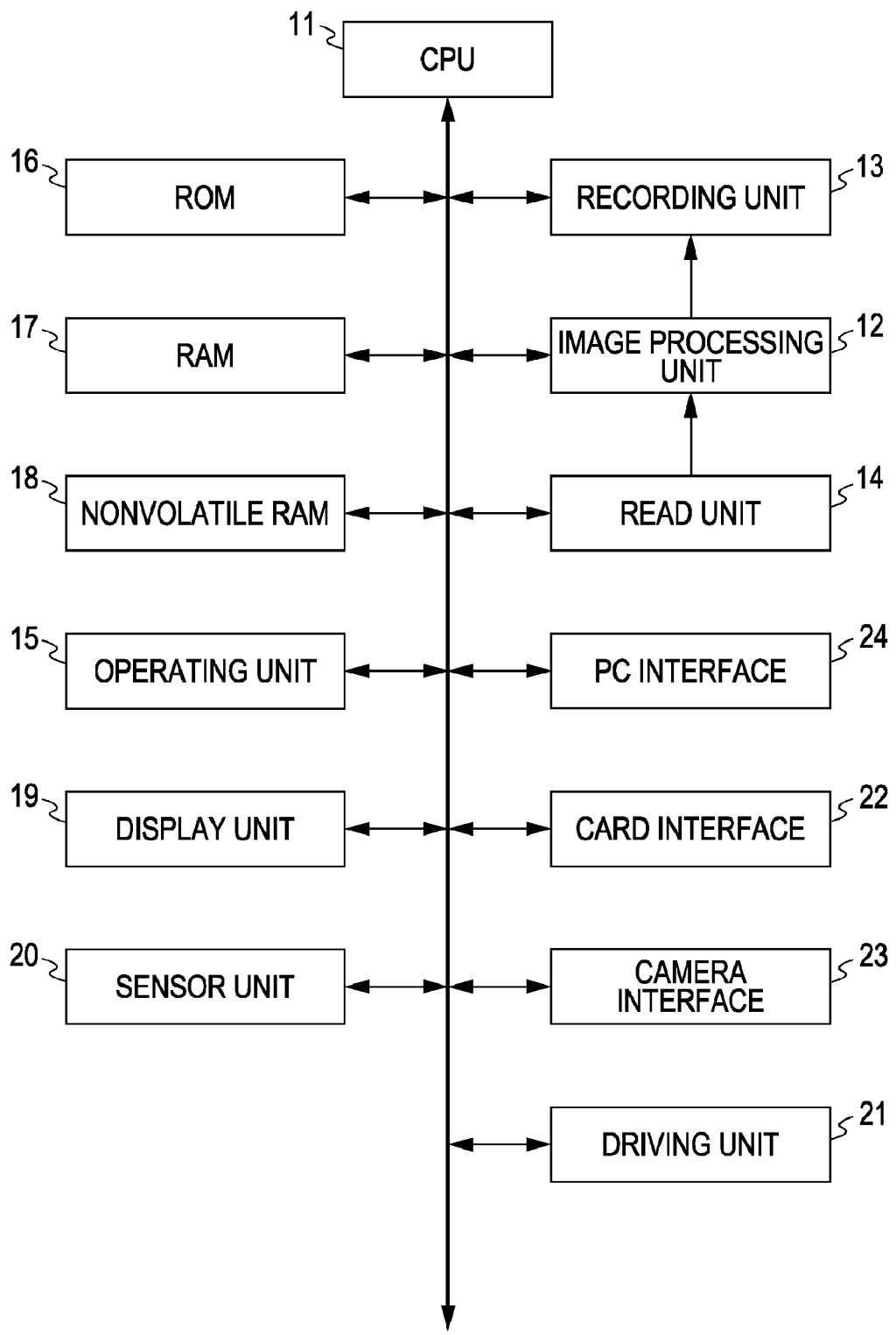
FIG. 13 is a diagram illustrating a control method of the MFP apparatus according to the exemplary embodiment.

FIG. 13 is a diagram illustrating exemplary components of the MFP apparatus according to the exemplary embodiment.

Referring to FIG. 13, a CPU 11 controls various components (functions) included in an image processing apparatus, and executes various programs for image processing stored in a ROM 16 in response to predetermined operations performed using an operating unit 15.

A read unit 14 including a CCD sensor, which corresponds to the reading device 34 shown in FIG. 2, reads an original image and outputs analog luminance data including color components of red (R), green (G), and blue (B). Note that the read unit 14 may include a contact image sensor (CIS) instead of the CCD sensor. Furthermore, when the image processing apparatus includes the ADF 31 shown in FIG. 2, order sheets are successively read, which is convenient.

A card interface 22 corresponding to the card slot 42 shown in FIG. 2 reads image data which is captured using a digital still camera (hereinafter referred to as a "DSC") and which is recorded in a memory card, for example, in response to a predetermined operation performed using an operating unit 15. Note that a color space of the image data read through the card interface 22 is converted from a color space of the DSC (a YCbCr color space, for example) into a standard RGB color space (for example, an NTSC-RGB color space or an sRGB color space) using an image processing unit 12 as needed. Furthermore, in accordance with header information thereof, the read image data is subjected to various processes necessary for application, such as resolution conversion for attaining effective pixels as needed.

A camera interface 23 corresponding to the camera port 43 shown in FIG. 2 is used to read image data by being directly connected to the DSC.

The image processing unit 12 performs image processing including image analysis, calculation of conversion characteristics, conversion of a luminance signal (RGB) into a color density signal (CMYK), scaling, gamma conversion, quantization, and error diffusion, which will be described hereinafter with reference to FIG. 14, and processed image data is stored in a RAM 17. When the processed image data stored in the RAM 17 reaches a predetermined amount required for being recorded using a recording unit 13, the recording unit 13 performs a recording operation.

A nonvolatile RAM 18 corresponding to a battery-backuped SRAM, for example, stores data unique to the image processing apparatus. The operating unit 15 corresponding to the operating panel 35 shown in FIG. 2 is used to select image data stored in a storage medium, and includes a photo direct print start key used to start recording, an order sheet printing key, an order sheet reading key, a copy start key used at a time of black-and-white copy or color copy, a mode key specifying a mode relating to resolution and an image quality at a time of copy, a stop key used to stop copying, for example, a numeric keypad used to input the number of copies and a registration key. The CPU 11 detects pressing states of these keys and controls the units in response to the detected pressing states.

A display unit 19 corresponding to the display panel 39 shown in FIG. 2 has a dot-matrix liquid crystal display (LCD) and an LCD driver, and performs various display operations under control of the CPU 11. Furthermore, the display unit 19 displays thumbnail images of images corresponding to pieces of image data stored in the storage medium. The recording unit 13 corresponding to the printing device 33 shown in FIG. 2 includes an inkjet unit 701 and a universal IC, reads the data stored in the RAM 17 under control of the CPU 11, and outputs the data as a hard-copy print.

A driving unit 21 includes a stepping motor used to drive a paper feeding/discharging roller, a gear used to transmit driving force of the stepping motor, and a driver circuit used to control the stepping motor, which are operated when the read unit 14 and the recording unit 13 operate.

A sensor unit 20 includes a recording sheet width sensor, a recording sheet presence sensor, an original width sensor, an original presence sensor, and a recording medium sensor. The CPU 11 detects states of an original and a recording sheet in accordance with information obtained from the sensors.

A PC interface 24 is provided for communication between the PC and the MFP apparatus 1. The MFP apparatus 1 performs a printing operation and a scanning operation assigned by the PC through the PC interface 24.

When a copy operation is performed, the image data read using the reading device 34 is processed in the MFP apparatus 1 and is printed using the printing device 33.

When the copy operation is instructed using the operating unit 15, the read unit 14 reads an original placed on the platen glass to obtain data. The read data is transmitted to the image processing unit 12 where image processing is performed on the data, which will be described hereinafter, and is further supplied to the recording unit 13 where a printing operation is performed as recording processing which will be described hereinafter.

Image Processing

FIG. 14 is a flowchart illustrating the image processing performed when a copy operation is performed. The image processing is performed using the image processing unit 12 shown in FIG. 13.

Steps of the image processing will be described hereinafter. However, detailed descriptions of steps which are not fundamental steps of this exemplary embodiment are not described in detail.

Data which is read and converted from analog data into digital data using the read unit 14 is subjected to shading compensation for compensating for variation of an image pickup element in step S301.

Then, the data is subjected to input device conversion in step S302 where signal data corresponding to a color space region unique to a device is converted into a standard color space region such as an sRGB color space prescribed by IEC (International Electrotechnical Commission) or an AdobeRGB color space proposed by Adobe systems Incorporated. An example of a method for the conversion includes a calculation method using a matrix of three rows and three columns or a matrix of three rows and nine columns, or a look-up-table method of referring to a table listing conversion rules for determination.

The converted data is subjected to image compensation and image processing in step S303. Specifically, the data is subjected to edge emphasizing processing performed for compensating for blur generated when a reading operation is performed, character processing performed for improving legibility, and processing of removing offset generated when the reading operation is performed using optical irradiation.

In step S304, the data is subjected to scaling processing so as to be converted into data having a desired magnification which is specified by a user or which is determined by allocation copy of allocating two originals to one sheet. A bicubic convolution method or a nearest neighbor method is generally employed as a method for this conversion.

In step S305, the data of the standard color space such as the sRGB color space or the AdobeRGB color space is converted into signal data unique to an output device. In this exemplary embodiment, since the inkjet MFP apparatus 1 is taken as an example of the output device, the data is converted into data having information of ink colors of cyan, magenta, yellow, and black, for example.

Advantages of this exemplary embodiment are appropriately obtained by using a profile generated through a profile generation method, which will be described hereinafter, in this conversion operation.

In this way, a data format recordable using the MFP apparatus 1 is attained, and recording processing which will be described below is performed for recording.

In step S306, the data having information of ink colors is converted into data of a recordable level. For example, in a case where the data is to be converted into data of a binary level which indicates whether or not ink dots are set, the data having information of ink colors is converted into binary data using a quantization method such as error diffusion.

In this way, the data having information of ink colors is converted into the data format recordable using the MFP apparatus 1, and in accordance with the converted data, a recording operation is performed so that an image is formed.

The profile generation method performed in step S305 will now be described. This profile is realized in a system including a personal computer in which programs implementing operations which will be described with reference to FIGS. 4 to 12 are installed, an inkjet printer, and a spectrophotometer.

Figure 4:
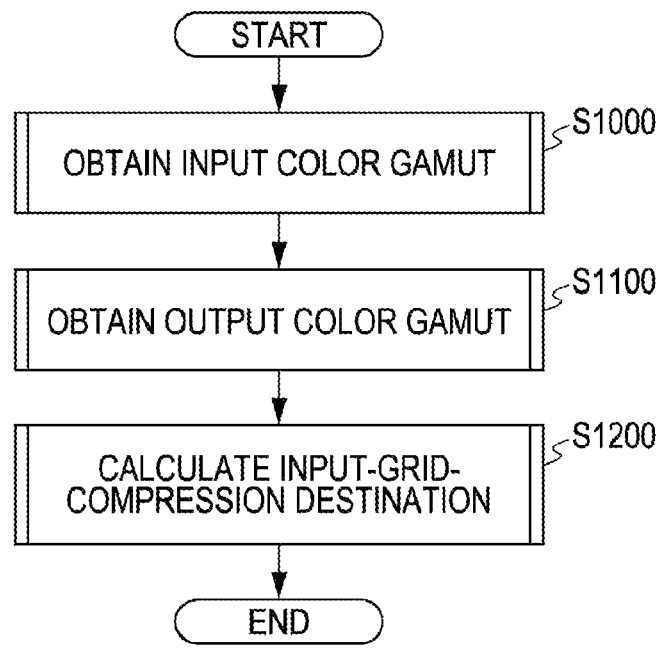
FIG. 4 is a flowchart illustrating a process of generating a profile according to the exemplary embodiment.

FIG. 4 is a flowchart illustrating a process of generating a profile used to convert colors in a first color reproduction range into colors in a second color reproduction range according to this exemplary embodiment.

In step S1000, a color gamut (the first color reproduction range) of an input color space (first color space) is obtained. That is, a color solid representing a color gamut of the sRGB color space is obtained, for example.

In step S1100, a color gamut (the second color reproduction range) of an output color space (second color space) is obtained. That is, a color solid representing a color gamut of the inkjet printer is obtained in this exemplary embodiment.

In step S1200, the color gamuts obtained in step S1000 and step S1100 are compared with each other, and calculation for determining a position in an output color space corresponding to an arbitrary discrete point in an input color space is performed through color compression. By this, a look-up-table which lists methods for compressing colors from the input color space to the output color space is generated.

The three steps described above will be successively described in detail.

Figure 5:
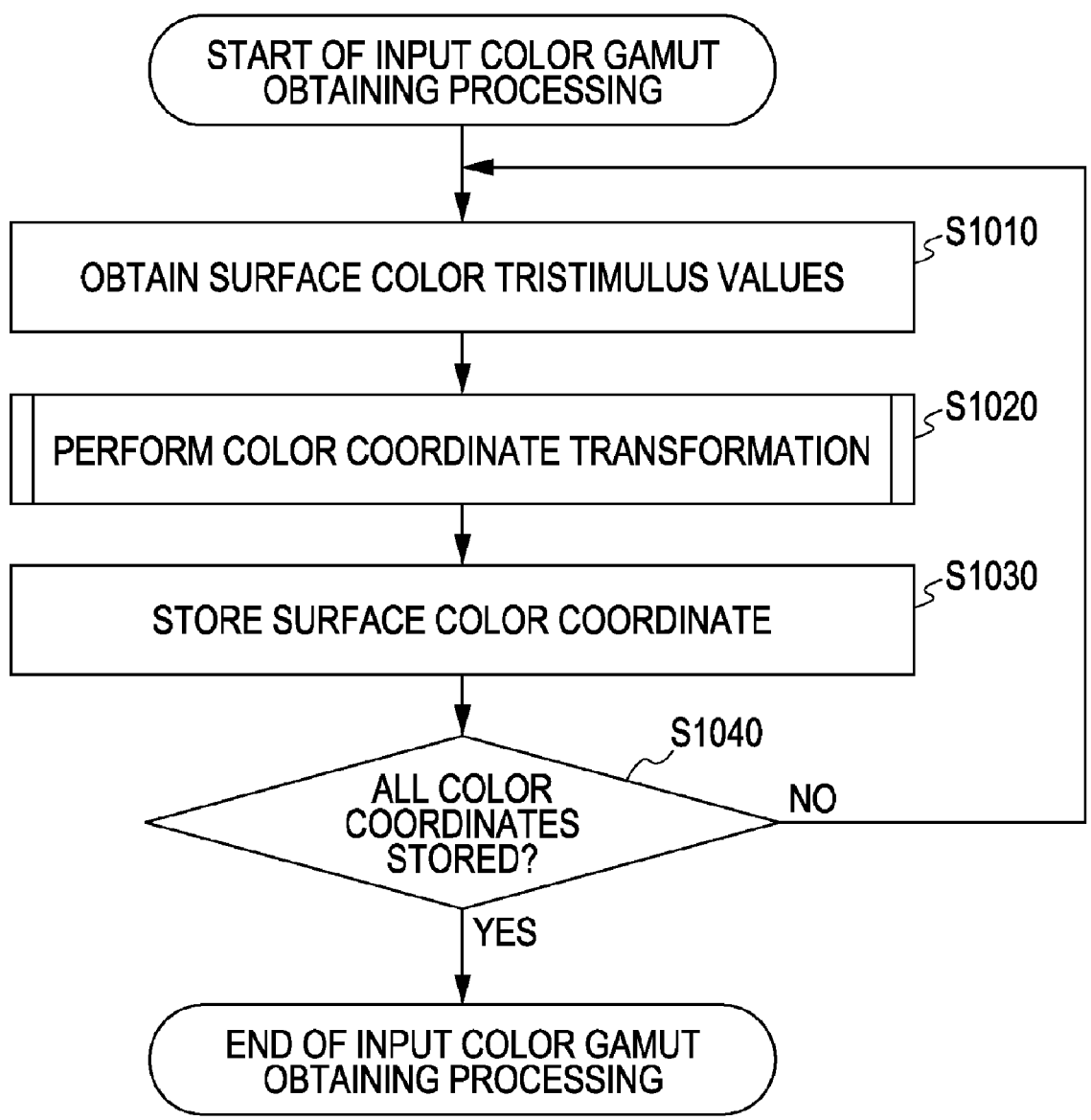
FIG. 5 is a flowchart illustrating input color gamut obtaining processing in detail according to the exemplary embodiment.

FIG. 5 is a flowchart illustrating the process performed in step S1000 in detail.

In gamut compression processing which will be described hereinafter, a hue profile of the gamut of the input color space is required to be obtained. However, to obtain the hue profile, intersection portions of a half plane which represents a profile with an axis of brightness as an end portion and which will be described with reference to FIG. 12 and the color gamut of the input color space are required to be obtained. The intersection portions are obtained by calculating, for color (hereinafter referred to as "surface color") representing a surface of the color gamut of the input color space, the sufficient number of color coordinates of points which have possibilities for being arranged on the half plane serving as the profile, and by calculating interposition points of the color gamut in the profile in accordance with the calculation. That is, the intersection portions are calculated from a surface shape of the color gamut of the input color space.

Figure 12:
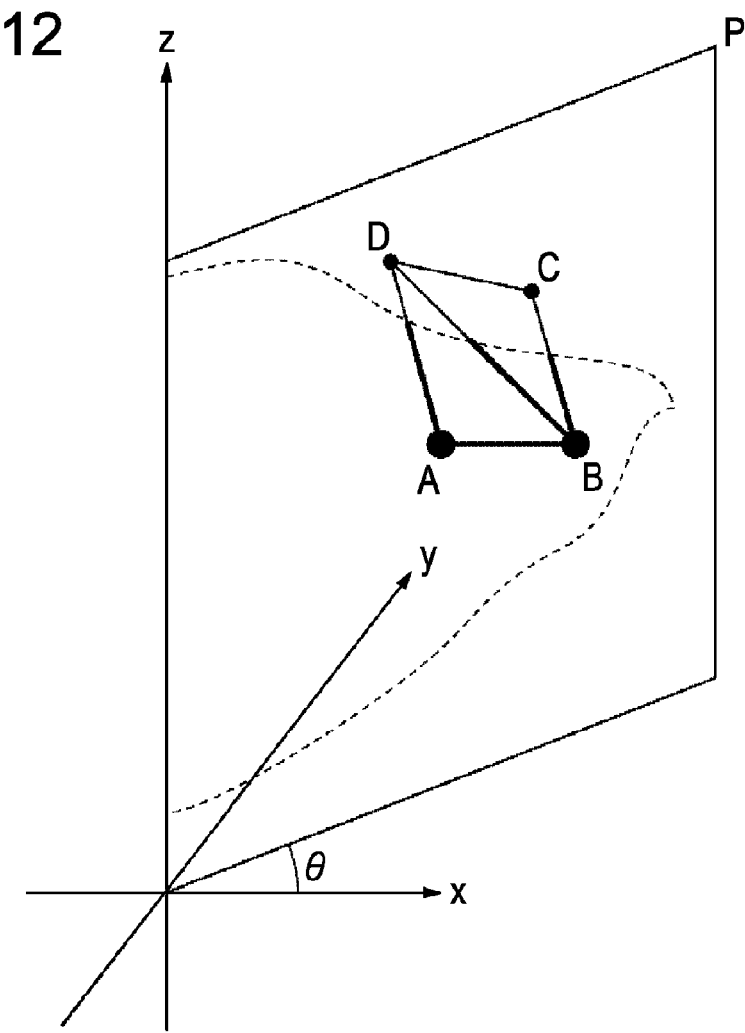
FIG. 12 is a diagram illustrating hue profile calculation processing performed on an input color space gamut according to the exemplary embodiment.

This operation will be described with reference to FIG. 12. FIG. 12 shows a three-dimensional space including orthogonal components of x, y, and z.

A hue profile at an angle θ of the color gamut of the input color space is obtained by detecting how a half plane P at the angle θ intersects with the surface color of the input color space. For example, when a hue profile of a color gamut surface constituted by arbitrary points A, B, C, and D in the surface color in the vicinity of the angle θ (hue angles of the points A and B are smaller than the angle θ, and hue angles of the points C and D are larger than the angle θ) is to be obtained, intersection points of lines connecting the four points and the half plane P are obtained and the intersection points are connected to one another. This operation is performed from a brightest portion to a darkest portion of the surface color of the input color space. Accordingly, the hue profile of the color gamut of the input color space is obtained as indicated by a dotted line shown in FIG. 12. Note that a method utilizing a spline interpolation which is known as a method for obtaining a profile using intersections of a polyhedron having arbitrary discrete points as vertexes and a plane may be employed.

Although the number of surface grid points (1598 points) obtained when RGB components of an sRGB color solid are each divided into 17 grids at even intervals is employed as "the sufficient number" in this exemplary embodiment, if an aggregation of points capable of reproducing the surface shape of the input color space with sufficient accuracy is obtained, the aggregation of points may be employed.

In step S1010, tristimulus values XYZ are obtained for the surface color for the surface of the input color space. Since the input color space is the sRGB color space in this exemplary embodiment, the tristimulus values XYZ are obtained in accordance with definition of the sRGB color space.

In step S1020, The tristimulus values XYZ obtained in step 1010 are converted so as to obtain color coordinates for individual color gamuts in a color space by combining color spaces having high visual constant hue properties with one another which will be described with reference to FIGS. 9 and 10. Note that color coordinate transformation processing performed in step S1020 will be described hereinafter in detail.

In step S1030, the obtained color coordinates are stored in a memory, for example.

In step S1040, it is determined whether all color coordinates corresponding to 1598 points for the surface color of the surface of the input color space are stored in the memory. When the determination is negative, the process returns to step S1010 and the process from step 1010 onward is performed. On the other hand, when the determination is affirmative, the process is terminated.

Figure 6:
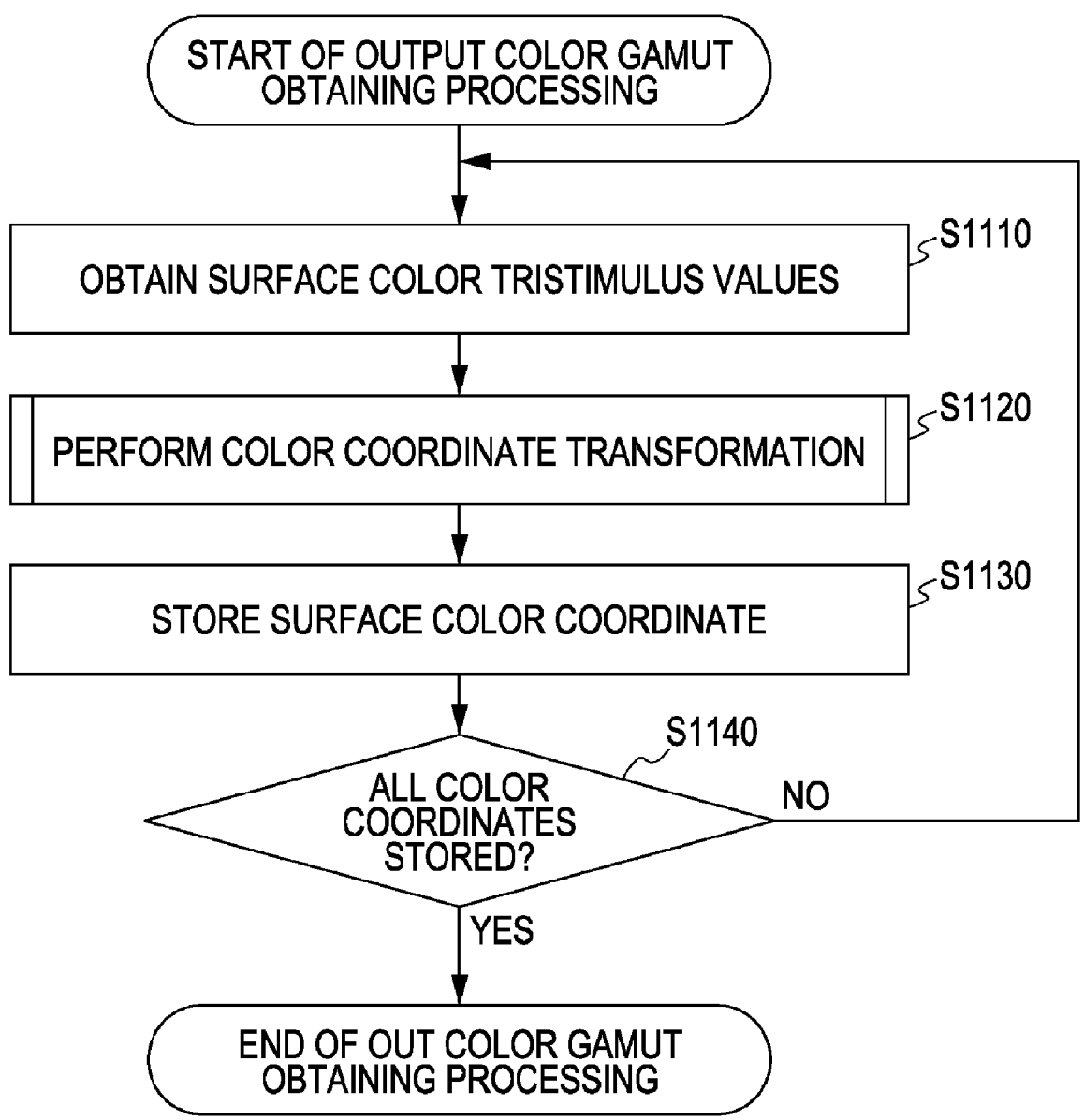
FIG. 6 is a flowchart illustrating output color gamut obtaining processing in detail according to the exemplary embodiment.

FIG. 6 is a flowchart illustrating the process of step S1100 in detail.

In the gamut compression processing which will be described hereinafter, a hue profile of the gamut of the output color space is required to be obtained. As with the input color space, the hue profile of the gamut of the output color space is calculated from a surface shape of the color gamut of the output color space. In this exemplary embodiment, the inkjet printer is employed as the output device, and a surface shape of a color gamut of the inkjet printer is obtained by printing the sufficient number of color patches of the surface in advance and performing color measurement on the color patches using a spectrophotometer, for example. Note that although the number of surface grid points (414 points) obtained when the color gamut of the inkjet printer is divided into 729 (9×9×9) grids is employed as "the sufficient number" in this exemplary embodiment, if an aggregation of points capable of reproducing the surface shape of the color gamut of the inkjet printer with sufficient accuracy is obtained, the aggregation of points may be employed.

In step S1110, tristimulus values XYZ are obtained for the surface color of the output color space. Since the tristimulus values XYZ are obtained by measuring, using the spectrophotometer, the surface color patches are printed using the inkjet printer, for example.

In step S1120, the tristimulus values XYZ obtained in step 1110 are converted so as to obtain color coordinates for individual color gamuts in a color space by combining color spaces having high visual constant hue properties with one another which will be described with reference to FIGS. 9 and 10. Note that the color coordinate transformation processing performed in step S1120 will be described hereinafter in detail.

In step S1130, the obtained color coordinates are stored in a memory, for example.

In step S1140, it is determined whether all color coordinates corresponding to 414 points for the surface color of the surface of the output color space are stored in the memory. When the determination is negative, the process returns to step S1110 and the process from step 1110 onward is performed. On the other hand, when the determination is affirmative, the process is terminated.

Figure 7:
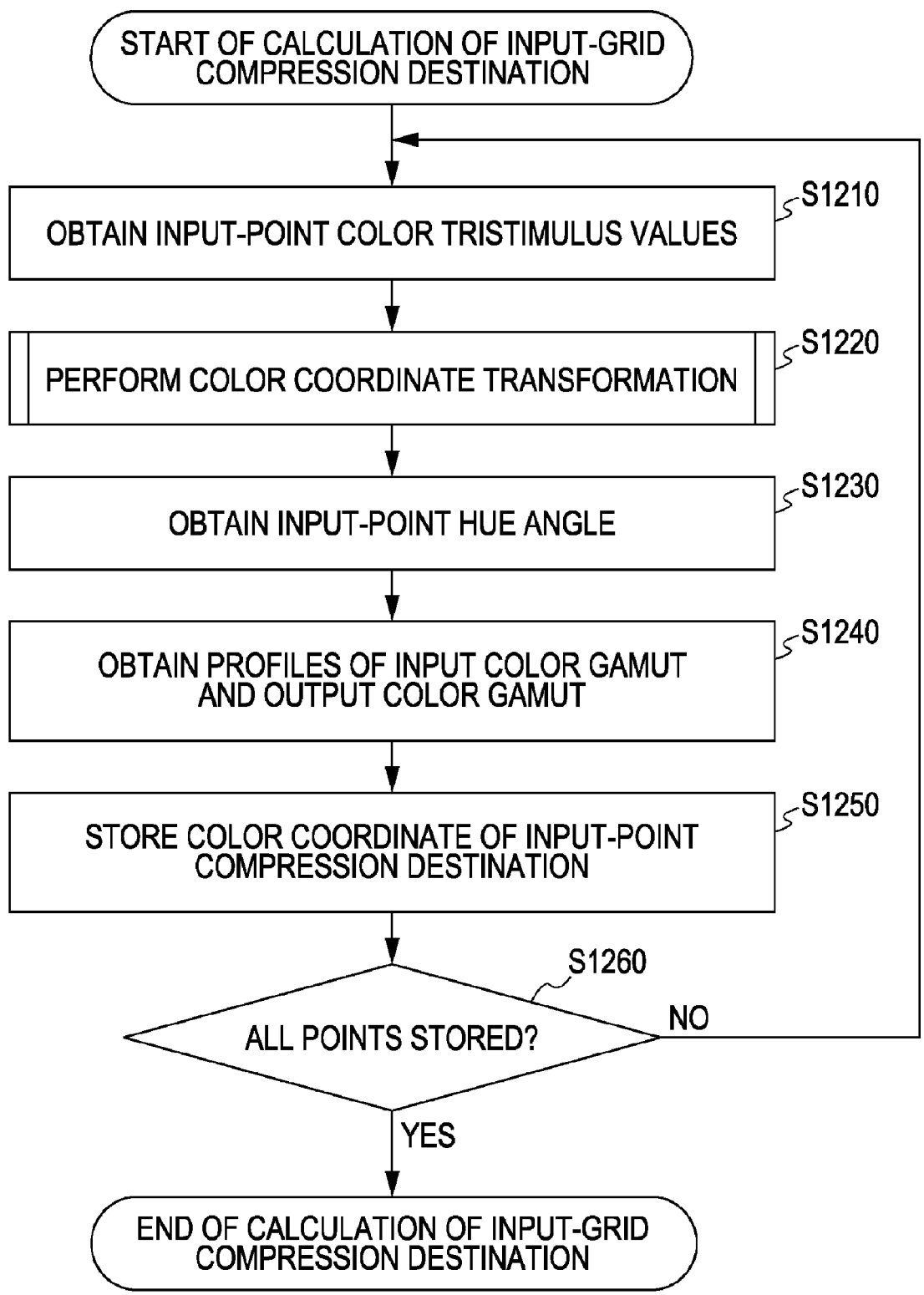
FIG. 7 is a flowchart illustrating input-grid compression destination calculation processing in detail according to the exemplary embodiment.

FIG. 7 is a flowchart illustrating the process of step S1200 in detail.

For (17×17×17) grid points (4913 points), color coordinates after compression are obtained and stored in the memory, and a look-up-table (profile) used when the color space conversion from the input color space (first color space) to the output color space (second color space) is performed is generated. All colors of the input color space are converted into colors of the output color space by the color space conversion processing by referring to the look-up-table and performing compensation processing. Note that although the look-up-table corresponds to 17 grids in this exemplary embodiment, the number of grids may be changed in accordance with required accuracy.

In step S1210, tristimulus values XYZ of the grid points of the input color space are obtained. Since the input color space is the sRGB color space in this exemplary embodiment, the tristimulus values XYZ are obtained in accordance with definition of the sRGB color space.

In step S1220, the tristimulus values XYZ obtained in step 1110 are converted so as to obtain color coordinates for individual color gamuts in a color space by combining color spaces having high visual constant hue properties with one another which will be described with reference to FIGS. 9 and 10. Note that the color coordinate transformation processing performed in step S1220 will be described hereinafter in detail.

In step S1230, the color coordinates obtained in step S1220 are converted into cylindrical polar coordinates so that a hue angle is obtained.

In step S1240, a half plane which has the hue angle obtained in step S1230 and which has an axis of brightness as an end portion thereof, a profile of the color gamut of the input color space, and a profile of the color gamut of the output color space are obtained. The profiles are obtained by the method described above with reference to FIG. 12.

In step S1250, colors of the grid points of the input color space are subjected to gamut compression processing on the basis of a shape of the profile of the color gamut of the input color space obtained in step S1240 and a shape of the profile of the color gamut of the output color space obtained in step S1240.

As a method for performing the gamut compression processing, any known method performed using a fixed hue angle (a hue angle which corresponds to a signal value before and after the gamut compression processing is stored) may be employed.

A direction of the compression may be a brightness direction in which brightness of image data is to be compressed or a saturation direction in which saturation of the image data is to be compressed. Alternatively, the direction of compression may be a radiation direction toward an arbitrary gray point (a point on a brightness axis). These directions may be appropriately switched in accordance with positions of the input grid points and may be used in combination.

An amount of the compression may be obtained by a method for uniformly performing compression on all color gamuts while gradation continuity preservation is emphasized (a so-called perceptual method), or a method for compressing colors other than colors in the output color gamut while reproducibility of input colors is emphasized (a so-called calorimetric method). Alternatively, a method which is obtained by combining these methods may be employed.

Figure 8:
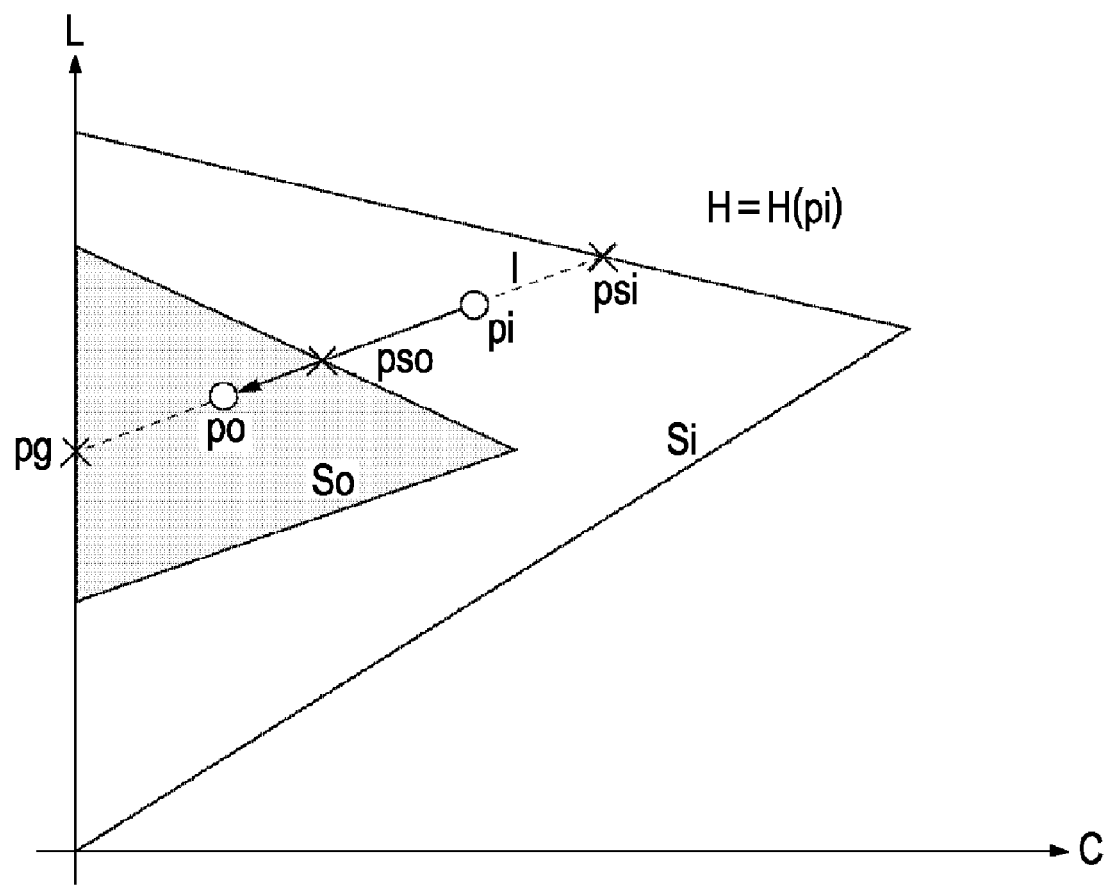
FIG. 8 is a diagram illustrating gamut compression processing according to the exemplary embodiment.

In this exemplary embodiment, as a simple example, uniform compression processing in which a gray point is set as a compression convergence point will be described with reference to FIG. 8.

A description is made provided that a color coordinate of an input point is obtained and a hue angle of the color coordinate is H(si).

It is assumed that Si denotes a color gamut profile of the input color space, So denotes a color gamut profile of the output color space, and pg denotes the gray point serving as the compression convergence point. A dashed line l connecting a point pi to the point pg denotes a compression direction.

Assuming that an intersection point of the color gamut profile Si and the line l is denoted by psi and an intersection point of the color gamut profile So and the line l is denoted by pso, a color coordinate po of an input point pi is obtained using the following expression. Note that all coordinates in FIG. 8 are represented by vectors having the point pg as an origin.

$$po=pso\times(|pi|/|psi|) \quad (1)$$

Note that before or after the color compression processing is performed in this step, a process of changing a shape of the input color space and a shape of the output color space or a process of smoothing a compression result may be performed as needed so that the color compression processing is effectively performed.

In step S1260, it is determined whether all points are stored. When the determination is negative, the process returns to step S1210 and the process from step S1210 onward is repeatedly performed. On the other hand, when the determination is affirmative, the process is terminated.

Profiles are obtained by associating color coordinates for all grids of the input color space which are obtained after the gamut compression processing with color coordinates in a device-independent color space (the device corresponds to the inkjet printer). Specifically, a patch group which corresponds to a device color group of a color gamut reproducible using the inkjet printer is generated using the inkjet printer, and the patch group is read using the spectrophotometer. By this, the association between a value which is obtained by converting a color in a CIEXYZ color space into a color in an Lab color space and which is read using the spectrophotometer and the device color group is obtained. Furthermore, color coordinates obtained after the gamut compression processing is performed are associated with the device color using the association described above. In this way, profiles in which the color coordinates which correspond to all grids of the input color space and which are obtained after the gamut compression processing are associated with the device-independent color space (the device corresponds to the inkjet printer) are generated.

Accordingly, profiles used in the gamut compression processing performed in a color space having an excellent visual constant hue property are generated for individual color gamuts. Then, color space compression processing is performed on the input image data in the first color reproduction range to be processed using the profiles so that the image data in the second color reproduction range is obtained. In this way, when the gamut compression processing is performed while hue angles of the input image data are fixed, the device color is obtained with high accuracy (with less hue change). Image data having this device color is used for the recording processing as described above.

Next, the color coordinate transformation processing including color region dividing processing performed in step S1020, step S1120, and step S1220 will be described. FIG. 9 is a flowchart illustrating the color coordinate transformation processing described above in detail.

In step S1320, a hue angle Hue(JCh) which is a hue angle of a variable JCh of the CIECAM02 color space is obtained using the tristimulus values (CIEXYZ) of a color (hereinafter referred to as a "color of interest") to be subjected to the color coordinate transformation processing.

In step S1330, it is determined whether the color of interest is a color in the vicinity of yellow using the hue angle Hue (JCh).

In this exemplary embodiment, it is assumed that a range of a hue angle between 77 degrees and 119 degrees exclusive corresponds to a color in the vicinity of yellow. When it is determined that the hue angle Hue(JCh) is included in this range, the process proceeds to step S1331, and otherwise, the process proceeds to step S1340.

In step S1331, a hue angle Hue(Lab) in the CIELab color space which exhibits an excellent visual constant hue property in the vicinity of yellow is obtained using the tristimulus values (CIEXYZ) of the color to be subjected to the color coordinate transformation processing.

In step S1332, an amount of offset is added to the hue angle Hue(Lab) obtained in step S1331 so as to obtain a hue angle Hue(Lab'). In this exemplary embodiment, four degrees is added to the hue angle Hue(Lab). The reason the amount of offset is added to the hue angle will be described hereinafter.

In step S1333, it is determined whether the color of interest is a color in the vicinity of yellow using the hue angle Hue (JCh).

In this exemplary embodiment, it is assumed that a color included in a range of a hue angle from 90 degrees to 105 degrees exclusive is a color in a yellow region. When it is determined that the hue angle Hue(JCh) is included in this range, the process proceeds to step S1334, and otherwise, the process proceeds to step S1335. Note that, although the yellow region is set so as to be larger than 90 degrees and smaller than 105 degrees in this exemplary embodiment, the yellow region is not limited to this range. Any region may be set as the yellow region as long as the region is in the vicinity of H=100° and is acceptable as the yellow region by those who skilled in the art. In this exemplary embodiment, a hue angle in the range larger than 90 degrees and smaller than 105 degrees including a hue angle in the vicinity of H=100° which is acceptable as the yellow region by those who skilled in the art is determined as the yellow region.

In step S1334, the hue angle Hue(Lab') obtained in step S1332 is determined as a hue angle NewHue.

In step S1335, the hue angle Hue(Lab') and the hue angle Hue(JCh) are combined with each other so that the hue angle NewHue is obtained.

Here, assuming that the hue(JCh) is a variable x, a contribution rate ef1 is obtained using the following expressions.

A case where the variable x is larger than 105 and smaller than 119:

$$ef1=(119-x)/(119-105) \quad (2)$$

A case where the variable x is larger than 77 and smaller than 90:

$$ef1=(77-x)/(77-90) \quad (3)$$

Note that a contribution rate ef2 of the hue angle Hue(Lab') is obtained by subtracting the contribution rate ef1 from 1.

The hue angle NewHue is obtained using the contribution rates ef1 and ef2 as follows.

$$NewHue=ef1*Hue(JCh)+ef2*Hue(Lab') \quad (4)$$

In this way, the hue angle NewHue which is a third hue angle value is obtained by weighted averaging using a first hue angle value based on a JCh color space definition and a second hue angle value based on a Lab color space definition (the amount of offset is added to the hue angle as will be described hereinafter). Note that in this case, JCh represents the first color space definition and Lab represents the second color space definition.

Here, the reason the amount of offset is added to the hue angle in step S1332 will now be described.

The JCh color space and the CIELab color space have hue angles which are different from each other and both of which indicate an identical color (yellow pure color, for example). For example, a plane having a hue angle Hue(JCh) of 77 degrees and a hue angle Hue(JCh) of 119 degrees which are set as boundaries of the yellow region as described above is shown in FIG. 10A. However, when the same plane is projected in the CIELab color space, a solid line roughly shown in FIG. 10B is obtained. Here, a problem which arises when the offset is ignored and the hue angle NewHue is obtained through step S1334 or step S1335 will be described.

Figure 10C:
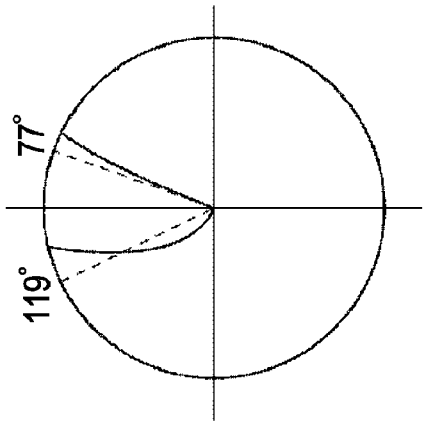
FIGS. 10A to 10F are diagrams illustrating a process performed in the vicinity of a yellow region in the color coordinate transformation processing according to the exemplary embodiment.
Figure 10B:
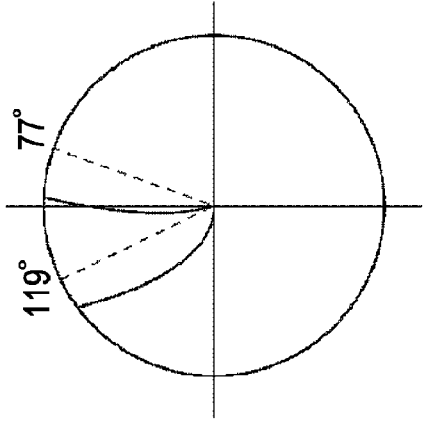
Figure 10A:
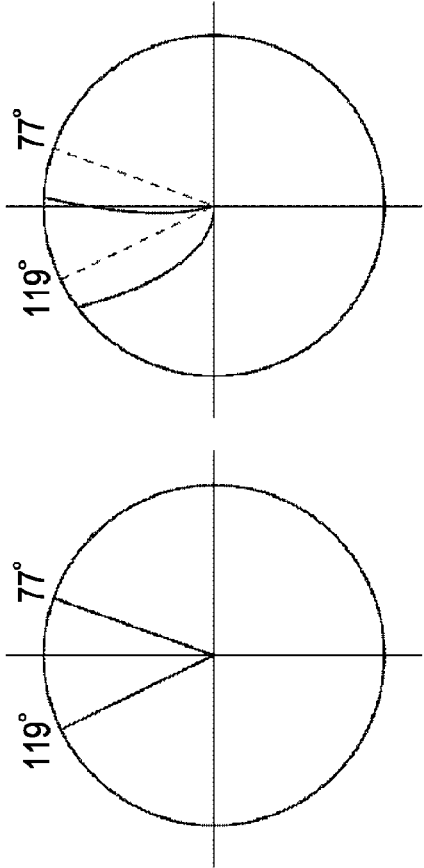
Figure 10F:
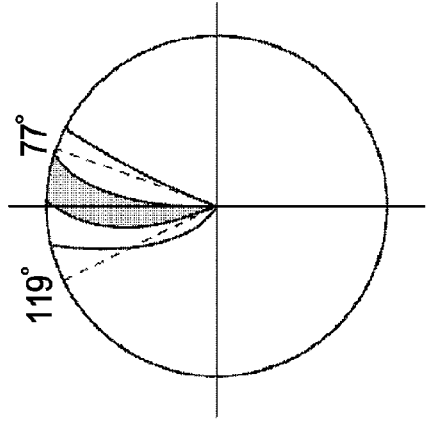
Figure 10E:
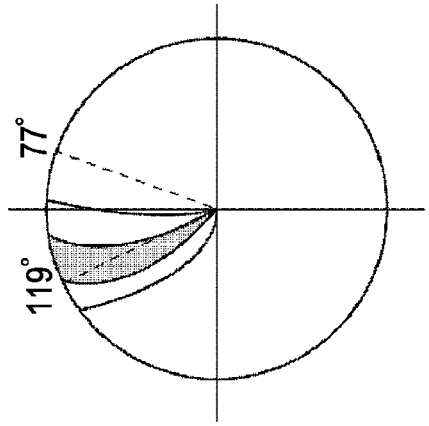
Figure 10D:
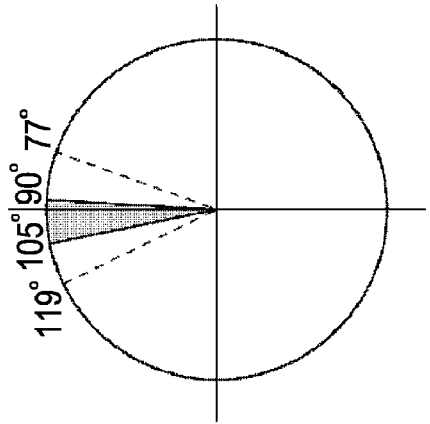

It is assumed that a hatched portion shown in FIG. 10D which corresponds to a range of the hue angle Hue(JCh) between 90 degrees and 105 degrees exclusive denotes the yellow region, and the hue angle NewHue of a color of interest corresponds to a hue angle Hue(Lab) (that is, the amount of offset is not added). In this case, the hue angle in the yellow region may be identical to a hue angle in a region out of a region in the vicinity of the yellow. The hue angle NewHue of the yellow region in this case is shown in FIG. 10E.

Referring to FIG. 10E, the hue angle NewHue includes a region in excess of 118 degrees. If the region in excess of 118 degrees is accepted and the color coordinate transformation processing is performed, some colors in the yellow region and some colors in a region out of a region in the vicinity of yellow (green in this exemplary embodiment) have identical hue angles.

To address this problem, the hue angle NewHue in the yellow region should be included in a range of the hue angle Hue(JCh) in the region in the vicinity of yellow.

In this exemplary embodiment, since the amount of offset is added in step S1332, the hue angle Hue(Lab') is rotated in advance so as to be included in a range indicated by a solid line shown in FIG. 10C (hue angle approximation). With this operation, continuities in the vicinity of the boundaries are realized. In this way, since the hue angle NewHue in the yellow region is included in a range indicated by a hatched portion shown in FIG. 10F, the hue angle NewHue in the yellow region is reliably included in the hue angle Hue(JCh) in the region in the vicinity of yellow and continuities between the region in the vicinity of yellow and adjacent regions are attained. Accordingly, the yellow region is separated from the color space and the tristimulus values XYZ in the yellow region are defined in the Lab color space.

In step S1340, it is determined whether the color of interest is a color in the vicinity of blue using the hue angle Hue(JCh).

In this exemplary embodiment, it is assumed that a range of a hue angle between −101 degrees and −47 degrees exclusive corresponds to a color in the vicinity of blue. When it is determined that the hue angle Hue(JCh) is included in this range, the process proceeds to step S1341, and otherwise, the process proceeds to step S1350.

In step S1341, a hue angle Hue(Luv) in the CIELuv color space which exhibits an excellent visual constant hue property in the vicinity of blue is obtained using the tristimulus values (CIEXYZ) of the color to be subjected to the color coordinate transformation processing.

In step S1342, an amount of offset is added to the hue angle Hue(Luv) obtained in step S1341 so as to obtain a hue angle Hue(Luv'). In this exemplary embodiment, 8.5 degrees is added to the hue angle Hue(Luv).

In step S1343, it is determined whether the color of interest is a color in the vicinity of blue using the hue angle Hue(JCh).

In this exemplary embodiment, it is assumed that a color included in a range of a hue angle from −95 degrees to −66 degrees exclusive is a color in a blue region. When it is determined that the hue angle Hue(JCh) is included in this range, the process proceeds to step S1344, and otherwise, the process proceeds to step S1345. Note that although the hue angle Hue(JCh) of the blue region is set so as to be larger than −95 degrees and smaller than −66 degrees in this exemplary embodiment, the blue region is not limited to this range. Any region may be set as the blue region as long as the region is in the vicinity of H=−80° and is acceptable as the blue region by those who skilled in the art. In this exemplary embodiment, a hue angle in the range larger than −95 degrees and smaller than −66 degrees including a hue angle in the vicinity of H=−80° which is acceptable as the blue region by those who skilled in the art is determined as the blue region.

In step S1344, the hue angle Hue(Luv') obtained in step S1342 is determined as a hue angle NewHue.

In step S1345, the hue angle Hue(Luv') and the hue angle Hue(JCh) are subjected to blending processing so that a hue angle NewHue is obtained.

Note that the blending processing performed in step S1345 is the same as that performed in step S1335, and therefore, detailed description thereof is not repeated.

In step S1350, the hue angle Hue(JCh) obtained in step S1320 is determined to be a hue angle NewHue.

In step S1360, a brightness L in the CIELab color space is obtained using the tristimulus values (CIEXYZ) of the color to be subjected to the color coordinate transformation processing.

In step S1370, a saturation C(Lab) in the CIELab color space is obtained using the tristimulus values (CIEXYZ) of the color to be subjected to the color coordinate transformation processing. That is, the brightness L and the saturation C obtained on the basis of identical definition of the CIELab color space are employed in all regions.

In step S1380, a color coordinate having the brightness L, the saturation C(Lab), and the hue angle NewHue is output. In this way, the color coordinate transformation processing of transforming the tristimulus values CIEXYZ into the brightness L, the saturation C(Lab), and the hue angle NewHue is completed. Accordingly, in step S1020, in the grids on a surface of the input color space, the yellow region is defined in the Lab color space, the blue region is defined in the Luv color space, and other regions are converted into color space coordinates defined in the JCh color space. The color space conversion for each region is thus performed.

In step S1120, a similar operation is performed on surface color of the output color space. In step S1220, the similar operation is performed on all grids of the input color space.

According to the gamut compression processing described above, the color compression processing is performed while a visual constant hue property of the CIELab color space is reflected in a region in the vicinity of yellow, a visual constant hue property of the CIELuv color space is reflected in a region in the vicinity of blue, and a visual constant hue property of the JCh color space in the CIECA02 is reflected in other regions.

In this way, the color compression processing utilizing excellent visual constant hue properties for individual colors is realized by performing the gamut compression processing described above.

Other exemplary embodiments of the present invention will be described hereinafter.

In the foregoing exemplary embodiment, color coordinates in a plurality of points on surfaces of an input gamut and an output gamut are calculated and stored to obtain hue profiles at a time of the gamut compression processing. However, if a memory region sufficient in terms of space and time is not ensured for storing the color coordinates, the color coordinates may be stored as needed at the time of gamut compression processing.

In the foregoing exemplary embodiment, hue angle components are used for blending processing performed on a plurality of color spaces. However, brightness components and saturation components may be additionally used for the blending processing. Even when the brightness components and the saturation components are used for the blending processing, a visual constant hue property at the time of gamut compression processing is maintained.

In the foregoing exemplary embodiment, the blending processing is performed using a CIELab color space, a CIELuv color space, and a CIECAM02 color space. However, an experiment of a visual constant hue property may be similarly performed in a HVC color space or a PCCS color space, for example, and the blending processing is performed on the basis of a result of the experiment. Note that the HVC color space is a modified Munsell color system, and the PCCS color space is a Practical Color Coordinate System. In this case, a range of the blending processing and an amount of offset at the time of the blending processing may be appropriately set in accordance with characteristics of the color spaces.

In the foregoing exemplary embodiment, color spaces and regions to be subjected to the blending processing are determined in accordance with an experiment performed in the environment of the D50 light source. However, the experiment may be performed in an environment in which it is expected that a user uses the apparatus of the exemplary embodiment of the present invention, and a method for dividing a region of a color space may be determined in accordance with a result of the experiment.

In the foregoing exemplary embodiment, since a number of color gamuts employ the CIECAM02(JCh) color space, division of regions and a blending rate are determined on the basis of the hue angle Hue(JCh) taking compatibility with the color gamuts into consideration. However, the division of regions and the blending rate may be determined in accordance with a hue angle in another color space in accordance with the result of the experiment described above.

In the foregoing exemplary embodiment, when the blending processing is performed on the plurality of color spaces, the blending rate is linearly changed in accordance with a hue angle Hue(JCh) of s color to be subjected to the blending processing. However, the blending rate may be nonlinearly changed as long as a total of blending rates of the color spaces is 1.

In the foregoing exemplary embodiment, when the plurality of color spaces are subjected to the blending processing, since an amount of offset is added to a hue angle of one of color spaces subjected to the blending processing, results obtained through color coordinate transformation processing performed on a plurality of colors have values different from one another. However, in addition to the addition of the amount of offset, a process of changing a hue angle width of one of the color spaces may be performed as a process performed in the vicinity of boundaries. This process will now be described.

It is assumed that color spaces to be subjected to blending processing have ranges of hue angles representing regions to be subjected to the blending processing considerably different from each other. For example, when the blending processing is performed from red to magenta, a distance between a hue angle of red and a hue angle of magenta is represented by approximately 30 degrees in one (color space A) of the color spaces to be subjected to the blending processing. Furthermore, for example, a distance between a hue angle of red and a hue angle of magenta is represented by approximately 60 degrees in the other (color space B) of the color spaces to be subjected to the blending processing. In this case, the distance between the hue angle of red and the hue angle of magenta in the color space B is changed so as to be represented by approximately 30 degrees in advance. Accordingly, chroma transitions from red to magenta at a hue angle of 1 degree in the color space A and the color space B are approximated with each other. Consequently, the blending processing is performed with continuity in terms of color transition.

Figure 11A:
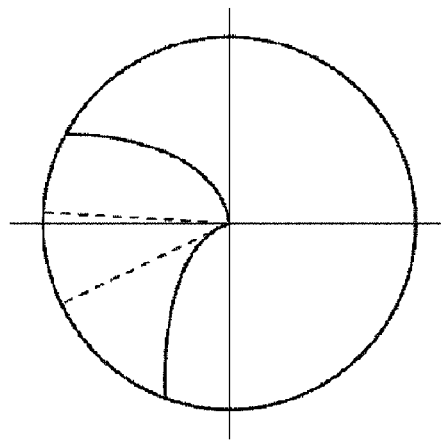
FIGS. 11A and 11B are diagrams illustrating hue-angle compression processing according to the exemplary embodiment.
Figure 11B:
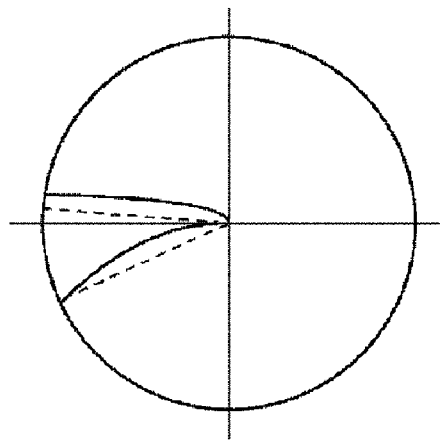

For example, when the color space A and the color space B are blended, the blending processing performed on the basis of a hue angle of the color space A will be described. Here, a region subjected to the blending processing is represented by a dashed line shown in FIG. 11A. An amount of offset is added to the hue angle of the color space B in advance, and the region subjected to the blending processing is mapped. Consequently, a result denoted by a solid line in FIG. 11A is obtained. This result is not subjected to the blending processing as it is. The hue angle of the color space B is compressed so that a shape indicated by a solid line shown in FIG. 11B is obtained before the blending processing is performed. Accordingly, generation of identical hue angles of the plurality of colors after the blending processing is further prevented. Note that since the hue angle is compressed, a distance between different hues is changed. However, a color at a constant hue angle is maintained, and therefore, a visual constant hue property is maintained. Furthermore, hue angles of a region of interest are not equally compressed, but a compression rate may be high at the center of the region (a portion in which the visual constant hue property of a color space to be compressed is reflected the most) and a compression rate may be low in a peripheral region.

Moreover, angle extension (hue angle expansion) processing may be performed using a method similar to a method for angle compression (angle reduction) processing in accordance with a color space region which is combined with the region subjected to the blending processing.

With this configuration, the color compression processing is realized while the visual constant hue property is maintained even after the color compression processing.

The foregoing exemplary embodiment of the present invention includes processing of storing a program used to operate units of the exemplary embodiments so that functions of the exemplary embodiments are realized in a storage medium, and reading the program stored in the storage medium as code so that the program is executed in a computer. Furthermore, the foregoing exemplary embodiment of the present invention includes the storage medium including the program, and the program.

Examples of the storage medium include a floppy disc, a hard disc, an optical disc, a magnet-optical disc, a CD-ROM (compact disc read-only memory), a magnetic tape, a non-volatile memory card, and a ROM.

Moreover, in addition to processing performed using the program stored in the storage medium described above, the foregoing exemplary embodiments of the present invention include processing which realizes the processing described above by operating in cooperation with another type of software and a function of an expansion board on an OS (operating system).

According to the exemplary embodiment of the present invention, the color compression processing capable of maintaining a visual constant hue property even after the color compression processing is performed is realized.

Furthermore, in regions in a plurality of color spaces, since a hue angle of a color to be subjected to the color conversion processing and a hue angle of the color which have been subjected to the color conversion processing is approximated with each other in each of the region. Accordingly, the color compression processing is effectively performed in the vicinity of a boundary in each of the plurality of color spaces.

Since definition of a single color space is employed for each of the brightness and the saturation and definitions of a plurality of color spaces are employed for a hue angle, compression rates of the brightness and the saturation at a time of gamut compression processing are obtained merely taking a characteristic of the single color space into consideration.

In general, gamut compression processing in a CIELab color space is well known, and a number of techniques of compressing brightness and saturation have been proposed. In addition to effects of such techniques, a visual constant hue property is sufficiently maintained by combining the techniques with the exemplary embodiments of the present invention.

Furthermore, in the vicinity of boundaries of regions employing different color space definitions, visual constant hue properties in the regions are gradually reflected and changed. Accordingly, the color compression processing is effectively performed in the vicinity of the boundaries.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-172747 filed Jun. 29, 2007, which is hereby incorporated by reference herein in its entirety.

What is claimed is:

1. A method for generating a profile used to convert a color of a first color reproduction range into a color of a second color reproduction range, the method comprising:
    performing color space conversion for converting signals in the first and second color reproduction ranges into color spaces unique to respective color regions of the first and second color reproduction ranges; and
    generating a profile by performing color compression on a color coordinate in the first color reproduction range converted in the color space conversion into a color coordinate in the second color reproduction range converted in the color space conversion.

2. The method according to claim 1, further comprising:
    rotating a hue angle in at least one of color gamuts in the vicinity of boundaries of the regions in the color space conversion so that the hue angle is approximated with hue angles of adjacent color gamuts, and continuities between the regions adjacent to one another are realized.

3. The method according to claim 1,
wherein in the color space conversion, the signals in the first and second color reproduction ranges are converted into any of a CIELab color space, a CIELuv color space, a CIECAM02(JCh) HVC color space, and Practical Color Coordinate System color space.

4. The method according to claim 3,
wherein, in the color space conversion, the signals in the first and second color reproduction ranges are converted into hue of a CIELab color space in a color region of yellow, and the signals in the first and second color reproduction ranges are converted into hue of a CIELuv color space in a color region of blue.

5. The method according to claim 4,
wherein, in the color space conversion, when a variable JCh of the CIECAM02 color space is employed, the color space conversion is performed in a color gamut in the vicinity of H=100 degrees, while a hue angle based on the CIELab is stored, and
the color space conversion is performed in a color gamut in the vicinity of H=−80 degrees, while a hue angle based on the CIELuv is stored.

6. The method according to claim 1,
wherein the color space conversion is performed on each of all the regions in accordance with an identical color space definition in terms of brightness and saturation.

7. The method according to claim 6,
wherein, in the color space conversion, the brightness and the saturation are subjected to the color space conversion in accordance with the CIELab color space definition so that a brightness of L and a saturation of C are obtained.

8. The method according to claim 1,
wherein, when the color of the first color reproduction range is converted into the color of the second color reproduction range, the color of the first color reproduction range is compressed so that the color of the second color reproduction range is obtained while a hue angle of the color of the first color reproduction range is stored and brightness and saturation of the color of the first color reproduction range are compressed.

9. The method according to claim 1,
wherein a third color gamut presences between a first color gamut and a color gamut,
a third hue angle of the third color gamut is obtained by performing weighted averaging using a first hue angle based on a definition of the first color space and a second hue angle based on a definition of the second color space, and
the color space conversion is performed based on the third hue angle.

10. An image processing apparatus
a color conversion unit configured to convert a color of a first color reproduction range in an image into a color of a second color reproduction range using a profile; and
a recording unit configured to record the image obtained through the color conversion;
wherein the profile is generated by converting signals in the first and second color reproduction ranges into color spaces unique to respective color regions of the first and second color reproduction ranges and performing color compression on a color coordinate in the converted first color reproduction range into a color coordinate in the converted second color reproduction range.

11. The image processing apparatus according to claim 10, further comprising:
a rotating unit configured to rotate a hue angle in at least one of color gamuts in the vicinity of boundaries of the regions using the color space conversion unit so that the hue angle is approximated with hue angles of adjacent color gamuts, and continuities between the regions adjacent to one another are realized.

12. The image processing apparatus according to claim 10,
wherein using the color space conversion unit, the signals in the first and second color reproduction ranges are converted into any of a CIELab color space, a CIELuv color space, a CIECAM02(JCh) HVC color space, and a Practical Color Coordinate System color space.

13. The image processing apparatus according to claim 10,
wherein the color space conversion unit converts the signals in the first and second color reproduction ranges into hue of a CIELab color space in a color region of yellow, and converts the signals in the first and second color reproduction ranges into hue of a CIELuv color space in a color region of blue.

14. The image processing apparatus according to claim 13,
wherein, in the color space conversion, when a variable JCh of the CIECAM02 color space is employed, the color space conversion is performed in a color gamut in the vicinity of H=100 degrees, while a hue angle based on the CIELab is stored, and
the color space conversion is performed in a color gamut in the vicinity of H=−80 degrees, while a hue angle based on the CIELuv is stored.

15. The image processing apparatus according to claim 10,
wherein the color space conversion is performed on each of all the regions in accordance with an identical color space definition in terms of brightness and saturation.

16. The image processing apparatus according to claim 15,
wherein, in the color space conversion, the brightness and the saturation are subjected to the color space conversion in accordance with the CIELab color space definition so that a brightness of L and a saturation of C are obtained.

17. The image processing apparatus according to claim 10,
wherein, when the color of the first color reproduction range is converted into the color of the second color reproduction range, the color of the first color reproduction range is compressed so that the color of the second color reproduction range is obtained while a hue angle of the color of the first color reproduction range is stored and brightness and saturation of the color of the first color reproduction range are compressed.

18. The image processing apparatus according to claim 10,
wherein a third color gamut presences between a first color gamut and a second color gamut,
a third hue angle of the third color gamut is obtained by performing weighted averaging using a first hue angle based on a definition of the first color space and a second hue angle based on a definition of the second color space, and the color space conversion is performed based on the third hue angle.

19. A computer-readable non-transitory storage medium including computer-executable instructions which cause a computer to perform operations for generating a profile used to convert a color of a first color reproduction range into a color of a second color reproduction range, the operations comprising:
performing color space conversion for converting signals in the first and second color reproduction ranges into color spaces unique to respective color regions of the first and second color reproduction ranges; and
generating a profile by performing color compression on a color coordinate in the first color reproduction range converted in the color space conversion into a color coordinate in the second color reproduction range converted in the color space conversion.

* * * * *